United States Patent [19]

Beecher

[11] 4,287,072

[45] Sep. 1, 1981

[54] WATER TREATMENT BY ION EXCHANGE RESIN

[75] Inventor: Jesse S. Beecher, Morristown, N.J.

[73] Assignee: Drew Chemical Corporation, Boonton, N.J.

[21] Appl. No.: 86,049

[22] Filed: Oct. 18, 1979

[51] Int. Cl.³ ............................ C02F 5/08; C02F 1/42
[52] U.S. Cl. .................................. 210/668; 210/696; 210/757
[58] Field of Search .................. 210/28, 29, 32, 37 R, 210/37 B, 38 R, 38 A, 38 B, 38 C, 50, 57–59, 668, 696, 757, 669

[56] References Cited

U.S. PATENT DOCUMENTS

| 4,022,711 | 5/1977 | Noack | 252/389 R |
| 4,026,664 | 5/1977 | Noack | 252/389 R |
| 4,039,443 | 8/1977 | Tahara et al. | 210/32 |

OTHER PUBLICATIONS

Betz Handbook of Industrial Water Conditioning, 7th Edition, (1976), p. 88.

Primary Examiner—Ivars C. Cintins
Attorney, Agent, or Firm—Louis E. Marn; Elliot M. Olstein

[57] ABSTRACT

In the treatment of water by the use of a cationic and/or anionic exchange resin, catalyzed hydrazine compound is added to the feed water to alleviate the iron fouling of the ion exchange resin.

9 Claims, No Drawings

WATER TREATMENT BY ION EXCHANGE RESIN

This invention relates to the treatment of water, and more particularly, to the treatment of water by use of an ion exchange resin.

In the treatment of water by use of an ion exchange resin, which may be the cationic type; for example, sodium or hydrogen cycle, and/or the anionic type; for example, hydroxide or chloride cycle, the presence of ferric ion in the water can cause problems in the ion exchange resin system; for example, the ion exchange resin may become fouled which causes a reduction in capacity of the resin.

In accordance with the present invention, there is provided an improved process for treating water by the use of an ion exchange resin wherein a catalyzed hydrazine compound is added to the water to be introduced into the ion exchange resin in an amount sufficient to alleviate iron fouling of the resin. Applicant has found that the presence of catalyzed hydrazine compound in the water to be treated reduces iron fouling of ion exchange resins of both the anionic and cationic type.

The catalyzed hydrazine compound which is employed in the present invention is known in the art and is composed of a hydrazine compound and a catalyst which is an organometallic complex and/or a quinone. Such catalyzed hydrazine is generally employed as a corrosion inhibiter and/or oxygen scavenger and is described, for example, in U.S. Pat. Nos. 3,511,349; 4,022,711; 4,022,712; and 4,026,664, which are all hereby incorporated as reference.

The hydrazine compound may be hydrazine itself or a derivative thereof, such as methylhydrazine, ethylhydrazine, propylhydrazine, butylhydrazine, 1,1-dimethylhydrazine, 1,1-dibutylhydrazine, and higher alkylated hydrazine compounds, hydroxy alkyl hydrazines, for example, hydroxyethyl hydrazine, as well as aromatic and aralkyl hydrazine compounds, may be employed. In addition to the hydrazine compounds mentioned, the hydrazine compound may be a salt, such as hydrazine phosphate, hydrazine monohydrochloride and dihydrochloride, hydrazine monohydrobromide and dihydrobromide, monohydrosulfate and dihydrosulfate, and the like.

The organometallic complex may be a reaction product of an inorganic salt of cobalt, manganese or copper with at least one organic ligand which is an unsubstituted and/or inertly substituted (substituent does not interfere with formation of complex and intended use of complex) amino derivative of a carboxylic acid or salt thereof, as described in U.S. Pat. No. 4,022,711. Such organic ligands are represented by the formulas:

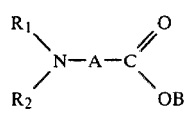

wherein A is a branched or straight chain alkylene biradical having about 1 to about 10 carbon atoms; B is hydrogen or any suitable cation which is capable of being replaced by cobaltous, manganous, or cupric ion; and $R_1$ and $R_2$ are each independently selected from the group consisting of hydrogen, lower alkyls, aryls, the radical:

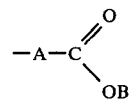

wherein A and B are defined above, and the radical:

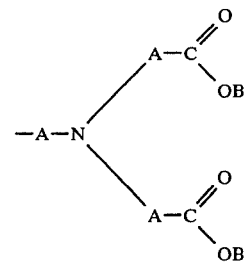

wherein each A and B are independently selected for the groups defined for A and B respectively; and

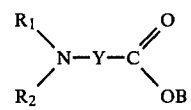

wherein Y is a substituted or unsubstituted ortho arylene biradical; and wherein B, $R_1$ and $R_2$ are as defined above.

Alternatively, as described in U.S. Pat. No. 4,026,664, the organic ligand can be one or more of unsubstituted and inertly substituted (a) ortho diamino aromatics, (b) ortho-dihydroxy aromatics or (c) ortho-amino hydroxy aromatics. The aromatic may include one, two or more aromatic nucleuses. The substituent group is generally one or more of alkyl, aralkyl and aryl groups, generally with 1–10 carbon atoms, as well as inorganic substituents, such as the sulfonic acid radical.

The inorganic salts which are employed to react with the organic ligands to produce the complex is represented by the formula:

$MX_{(2/n)}$ wherein M is cobalt, manganese, or copper metal ion, X is an inorganic anion, and n is the charge of the anion. Thus, the inorganic salt is one of cobalt, manganese, or copper in combination with two uninegative or one dinegative anion such as, for example, $NO_3^-$, $CL^-$, $Br^-$, $I^-$, or $SO_4^{--}$. The inorganic salt may be used in the form of an aqueous solution or in its crystalline forms as desired. Preferred inorganic salts are the cobaltous and manganous salts.

As hereinabove noted, a quinone may be employed to catalyze the hydrazine either alone or in conjunction with the organometallic complex. The quinone may be employed in the hydroxyl form.

Among the quinone compounds which may be used are the para-quinones, para-hydroquinones, para-naphthoquinones, para-anthraquinones, and the like, as well as their substituted derivatives. These include alkyl and aryl substituted quinones as well as those having hydrophilic substituents. Among the desired quinone compounds which may be used are the alkylated and arylated para-quinones and para-hydroquinones having about 1 to about 10 carbon atoms in the substituent, and those having substituent derivatives from carboxylic acids, sulfonic acid, carboxylic acid alkali metal salt, sulfonic acid alkali metal salt and nitro. Preferred are the lower alkyl para-quinones and para-hydroquinones having 1 to 5 carbon atoms in the alkyl substituent.

The catalyzed hydrazine compound is added to the water in an amount effective to reduce iron fouling. In general, the catalyzed hydrazine compound is added to the water to be treated in an amount to provide at least 0.02 ppm and preferably at least 0.2 ppm of catalyzed hydrazine compound in the water. In most cases, the catalyzed hydrazine compound need not be present in an amount greater than 20 ppm. The selection of an optimum amount of catalyzed hydrazine compound to effect a reduction of iron fouling is deemed to be well within the scope of those skilled in the art from the teachings herein.

Although the present invention is applicable to the treatment of water from any one of a wide variety of sources by use of an ion exchange resin, the invention has particular applicability to treatment of condensate water by use of an ion exchange resin, such as the water condensate generated in a steam turbine power system.

The invention will be further described with respect to the following examples; however, the scope of the invention is not to be limited thereby:

EXAMPLE 40 mls of fresh ion exchange resin (Rohm and Haas IR-120 Plus resin) was added to each resin column. The resins were then treated in the following manner:

(1) Exhaustion: Each column was treated with a solution containing 4000 ppm calcium as calcium carbonate, 5 ppm ferrous ion and additive as hereinafter indicated. The solutions were passed through each resin at a flow rate of 4–8 mls/min. (0.1–0.2 bed volumes/min). The effluent of each column was checked for calcium ion every 50 mls.

(2) Backwash: Each column was backwashed with demineralized water at such a flow rate as to expand the resin beads fully in the column until good bead classication was obtained.

(3) Regeneration: Each column was regenerated with 400 mls of a 10% sodium chloride-0.4% sodium hydroxide solution at a flow rate of 2–4 mls/min (0.05–0.1 bed volumes/min).

(4) Rinse: Each column was rinsed with 400 mls of demineralized water. The flow rate was 2–4 mls/min for the first 40 mls and 4 8 mls/min for the remainder.

Steps 1–4 were carried out either three or five times, each time being defined as one cycle.

The following tabulates the results of several experiments operated in accordance with the above procedure.

TABLE

| | Additive | Cycles | Amount of Iron Retained by Resin |
|---|---|---|---|
| 1. | None | 3 | 1.2% |
| 2. | Hydrazine (Uncatalyzed) (5ppm of 35% aqueous solution) | 3 | 0.9% |
| 3. | Hydrazine catalyzed with hydroquinone (5 ppm of 35% aqueous solution) | 5 | 0.203% |
| 4. | Hydrazine catalyzed with organocobalt compound (5 ppm of 35% aqueous solution) | 5 | 0.198% |

The above indicates that the use of a catalyzed hydrazine compound significantly reduces the amount of iron retained by an ion exchange resin during water treatment; i.e., reduced fouling. The catalyzed hydrazine showed improved results even though used for more ion exchange cycles.

Although the present invention is not to be limited to any theoretical reasoning, it is believed that iron fouling of the resin is alleviated by preventing ferrous ions present in the water from being converted to ferric ions and/or by converting formed ferric ions to ferrous ions.

The present invention is particularly advantageous in that by adding a catalyzed hydrazine compound to water being treated by an ion exchange resin, iron fouling of the resin is alleviated by significantly reducing or eliminating such iron fouling to thereby improve the operation of the resin.

Numerous modifications and variations of the present invention are possible in light of the above teachings and, therefore, within the scope of the appended claims, the invention may be practised otherwise than as particularly described.

I claim:

1. In a process for treating water by passing the water through an ion exchange resin, the improvement comprising:
   adding a catalyzed hydrazine compound to the water being treated prior to passage through the ion exchange resin
   in an amount effective to reduce iron fouling of the ion exchange resin; and passing the water containing said catalyzed hydrazine through the ion exchange resin to effect treatment of the water.

2. The process of claim 1 wherein the catalyzed hydrazine compound is present in the water in an amount of at least 0.02 ppm.

3. The process of claim 2 wherein the catalyzed hydrazine compound is present in the water in an amount of at least 0.2 ppm.

4. The process of claim 1 wherein the hydrazine compound is catalyzed with a quinone.

5. The process of claim 1 wherein the hydrazine compound is catalyzed with an organometallic complex.

6. The process of claim 1 wherein the hydrazine compound is hydrazine and catalyzed hydrazine is present in the water in an amount of at least 0.02 ppm.

7. The process of claim 6 wherein the hydrazine is catalyzed with a quinone.

8. The process of claim 6 wherein the hydrazine is catalyzed with an organometallic complex.

9. The process of claim 1 wherein the water treated is a water condensate generated in a steam turbine system.

* * * * *